(12) United States Patent
Kushibiki et al.

(10) Patent No.: US 7,157,169 B2
(45) Date of Patent: Jan. 2, 2007

(54) FUEL CELL

(75) Inventors: Keiko Kushibiki, Kanagawa-ken (JP); Masaharu Hatano, Kanagawa-ken (JP); Itaru Shibata, Kanagawa-ken (JP); Tatsuhiro Fukuzawa, Kanagawa-ken (JP); Naoki Hara, Kanagawa-ken (JP); Dong Song, Kanagawa-ken (JP); Yoshiko Hishitani, Kanagawa-ken (JP); Fuminori Satou, Kanagawa-ken (JP); Makoto Uchiyama, Kanagawa-ken (JP); Mitsugu Yamanaka, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 339 days.

(21) Appl. No.: 10/274,880

(22) Filed: Oct. 22, 2002

(65) Prior Publication Data
US 2003/0082423 A1    May 1, 2003

(30) Foreign Application Priority Data
Oct. 30, 2001    (JP) .................... P 2001-332088

(51) Int. Cl.
*H01M 8/04* (2006.01)
(52) U.S. Cl. .......................... 429/26; 429/38
(58) Field of Classification Search ............. 429/26, 429/31, 32, 38
See application file for complete search history.

(56) References Cited

U.S. PATENT DOCUMENTS

| | | | | |
|---|---|---|---|---|
| 4,770,955 A | * | 9/1988 | Ruhl | 429/33 |
| 5,549,983 A | * | 8/1996 | Yamanis | 429/32 |
| 6,258,474 B1 | * | 7/2001 | Diethelm et al. | 429/26 |
| 6,358,638 B1 | * | 3/2002 | Rock et al. | 429/13 |
| 6,737,182 B1 | * | 5/2004 | Keegan | 429/13 |
| 2002/0058165 A1 | * | 5/2002 | Gebhardt et al. | 429/13 |
| 2003/0091875 A1 | * | 5/2003 | Gebhardt et al. | 429/13 |

FOREIGN PATENT DOCUMENTS

| | | | |
|---|---|---|---|
| DE | 40 33 288 A1 | | 2/1991 |
| EP | 0 756 347 A2 | | 1/1997 |
| GB | 1 047 936 A | | 11/1996 |
| JP | 61158672 A | * | 7/1986 |
| JP | 63205058 A | * | 8/1988 |
| JP | 02186565 A | * | 7/1990 |
| JP | 04-018964 | | 2/1992 |
| JP | 5-205753 | | 8/1993 |
| JP | 07-153470 | | 6/1995 |
| JP | 8-102327 | | 4/1996 |
| JP | 06-306380 | | 11/1996 |
| JP | 10334933 A | * | 12/1998 |

(Continued)

OTHER PUBLICATIONS

Abstract of JP 61-118972-A, published Jun. 6, 1986.*

(Continued)

*Primary Examiner*—Gregg Cantelmo
(74) *Attorney, Agent, or Firm*—McDermott Will & Emery LLP

(57) ABSTRACT

A fuel cell of the present invention includes a fuel cell stack (1) for being formed by stacking a plurality of cell plates (2) having a flat shape, the cell plates (2) being configured by arranging a plurality of cells, the cell having an electrolyte layer (2a), a fuel electrode layer (2b) and an air electrode layer (2c). A combustion heater plate (3) includes a porous combustion plate (3a) and a gas non-pass layer (3b) covering a surface of the porous combustion plate (3a). The combustion heater plate (3) is disposed between the cell plates (2).

14 Claims, 10 Drawing Sheets

FOREIGN PATENT DOCUMENTS

| | | |
|---|---|---|
| JP | 11-224683 | 8/1999 |
| JP | 2002-313391 | 10/2002 |
| JP | 2003-533002 | 11/2003 |
| WO | WO 00/54356 A | 9/2000 |
| WO | WO 01/73881 | 10/2001 |
| WO | WO 01/86745 A2 * | 11/2001 |
| WO | WO 200186745 A2 * | 11/2001 |

OTHER PUBLICATIONS

T. Alstonet et al., "A 1000-cell SOFC reactor for domestic cogeneration", Journal of Power Sources 71, (1998) pp. 271-274.

K. Kendall et al., "Concept and technology of DH-Q-SOFC for efficient use of fossil fuel resources in electric vehicles", NEDO International Joint Research.

Alston T., et al. "A 1000-cell SOFC reactor for domestic cogeneration." Journal of Power Sources, vol. 71, 1998, pp. 271-274.

* cited by examiner

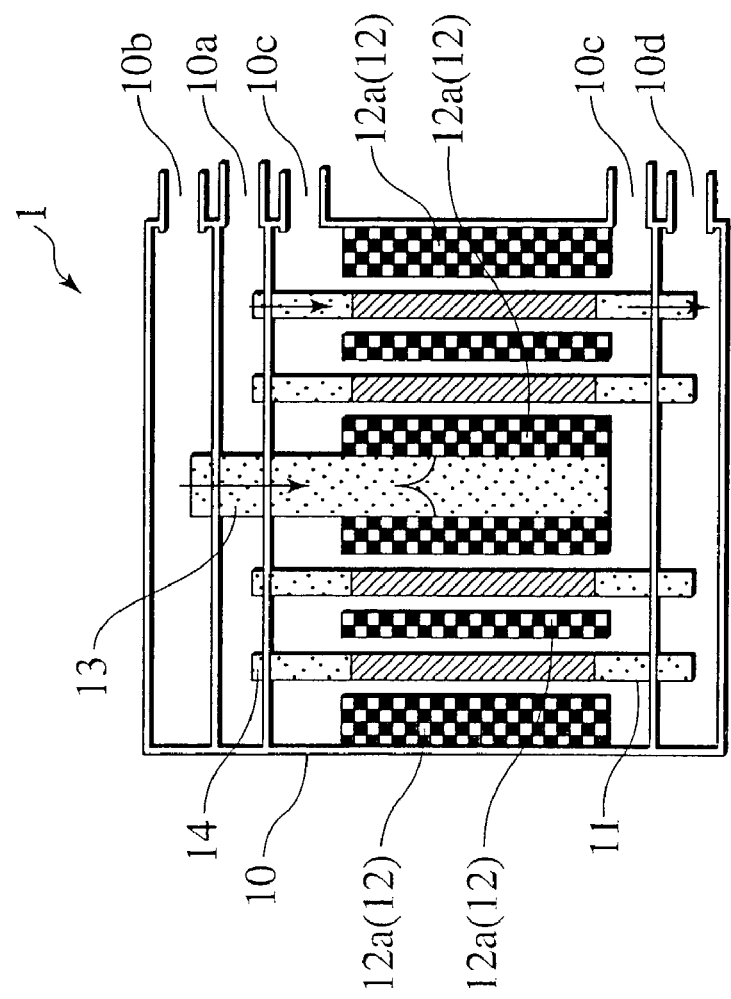
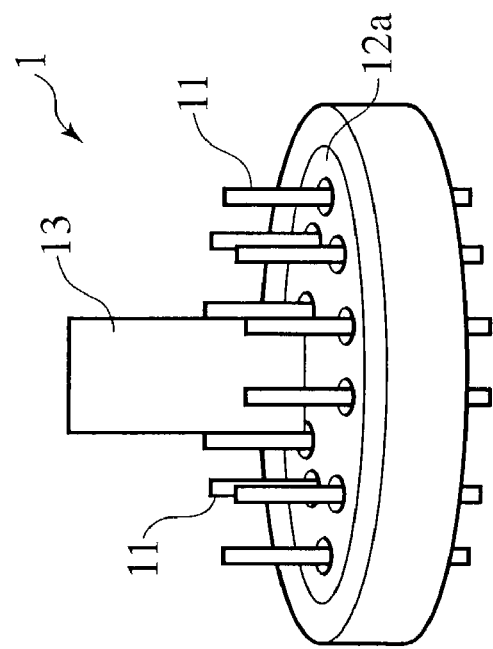
FIG.7A
FIG.7B

FUEL CELL

BACKGROUND OF THE INVENTION

1. Field of the Invention

The present invention generally relates to a fuel cell such as a solid oxide fuel cell or the like which has an electrolyte, a fuel electrode and an air electrode, and which generates electric energy by electrochemical reaction, and more particularly to a fuel cell having a following feature: a combustion heater is incorporated in the fuel cell, thereby improving both the starting performance and restarting performance of the fuel cell.

2. Description of the Related Art

A fuel cell has a structure where a high-performance electrolyte for conducting an ion such as an oxygen ion ($O^{2-}$), a proton ($H^+$) or the like is held between a porous air electrode and a porous fuel electrode. Moreover, the fuel cell generates an electromotive force by respectively supplying oxidizing gas containing oxygen gas to the air electrode side and reducing gas containing hydrogen or hydrocarbon gas to the fuel electrode side, and electrochemically reacting these gases with each other through the electrolyte.

As a conventional solid oxide fuel cell (Hereinafter, Solid Oxide Fuel Cell is abbreviated to SOFC.) which is a type of such fuel cells, for example, Japanese Patent Application Laid-Open No. H5-205753 discloses an SOFC including a flat-plate stack formed by alternately laminating single cell plates and separators, each single cell plates having an anode and a cathode respectively arranged on a front surface and a backside of a solid electrolyte plate, and each separator having a gas groove formed on one side to distribute fuel gas, and a gas groove on the other to distribute oxidant gas. Further, Japanese Patent Application Laid-Open No. H8-102327 discloses a hollow flat-plate fuel cell plate for forming a cell plate including a plurality of gas passages inside and also a separator function.

Generally, in such an SOFC, an operating temperature reaches 800 to 1000° C., so that heating must be carried out up to the operating temperature at starting time of the fuel cell. However, in the above publications, no mention is made of specific means for heating such a fuel cell stack.

Meanwhile, with regard to a cylindrical stack, a paper "A 1000-cell SOFC reactor for domestic cogeneration", pp. 271 to 274 of Journal of Power Sources 71 (1998), describes power generation by introducing fuel to cylindrical inner sides of a plurality of cylindrical cells, and air to outsides of the cells. In addition, the paper describes a process of introducing a mixture of hydrogen and air to the inside of the cell cylinder at starting time, and igniting it for combustion by an ignition coil arranged on an upper side of cell.

Also, an article "Concept and technology of DH-Q-SOFC for efficient use of fossil fuel resources in electric vehicles" presented at 45th SOFC workshop (held on May 9, 2001) describes installation of a combustion cylinder separately from a cell.

SUMMARY OF THE INVENTION

However, in the case of the flat-plate stack described in each of the foregoing publications, because of no heating means provided as described above, the entire stack is heated by a heating device installed outside of the stack at starting time. Thus, heating efficiency is low, requiring a great deal of starting time.

Moreover, in the case of the cylindrical stack described in the paper of Journal of Power Sources, since the cell functions as a fuel cylinder at starting time, an electrode layer formed on an inner or outer wall of the cell is damaged or oxidized, causing a problem of a reduction in an electrode characteristic.

Furthermore, in the method described in the article of the above-described 45th SOFC workshop, because of a cylindrical shape of the combustion cylinder, a cell heating degree varies from position to position, and even one cell is difficult to be heated homogeneously. Therefore, thermal stress is apt to be applied to the cell, causing damage. Also, even when some cells are quickly heated, it takes time for all the cells to be homogeneously heated, and output electric power of the cells to be made homogeneous. If there is variance in output electric power among the cells, a problem occurs, i.e., a great loss of the output electric power of the entire stack. For example, if temperatures are different among parts of the plurality of cells electrically connected in parallel, and a cell generating a small electric power voltage or a cell of a large internal resistance is connected, not only electric power generated by the cell cannot be taken out, but also power generated by a high output electric power cell is consumed inside, or heat is generated locally, causing a great loss. Therefore, there has been a need to efficiently and homogeneously heat a cell power generation portion by solving such problems, whereby time necessary for starting is shortened.

The present invention was made with the foregoing problems of the conventional fuel cell in mind. It is an object of the present invention to provide a fuel cell capable of quickly and homogeneously heating a power generation layer portion of the fuel cell up to a temperature of generating power, improving starting performance, generating power at a high output density with a small electric power loss immediately after starting of power generation, and preventing damage by a thermal shock to improve durability.

The first aspect of the present invention provides a fuel cell comprising: a fuel cell stack formed by stacking a plurality of cell plates, the cell plates configured by arranging a plurality of cells, each of the cells comprising an electrolyte layer, a fuel electrode layer formed on one surface of the electrolyte layer and an air electrode layer formed on another surface of the electrolyte layer; and combustion heater plates disposed among the cell plates.

BRIEF DESCRIPTION OF THE DRAWINGS

FIG. 7A is a schematic sectional view showing an example of a combustion heater being applied to a cylindrical fuel cell stack different from that of the sixth embodiment in a stack structure of a fuel cell according to a seventh embodiment of the present invention;

FIG. 7B is a perspective view of the cylindrical fuel cell stack shown in FIG. 7A;

DETAILED DESCRIPTION OF THE PREFERRED EMBODIMENTS

Figure 1:
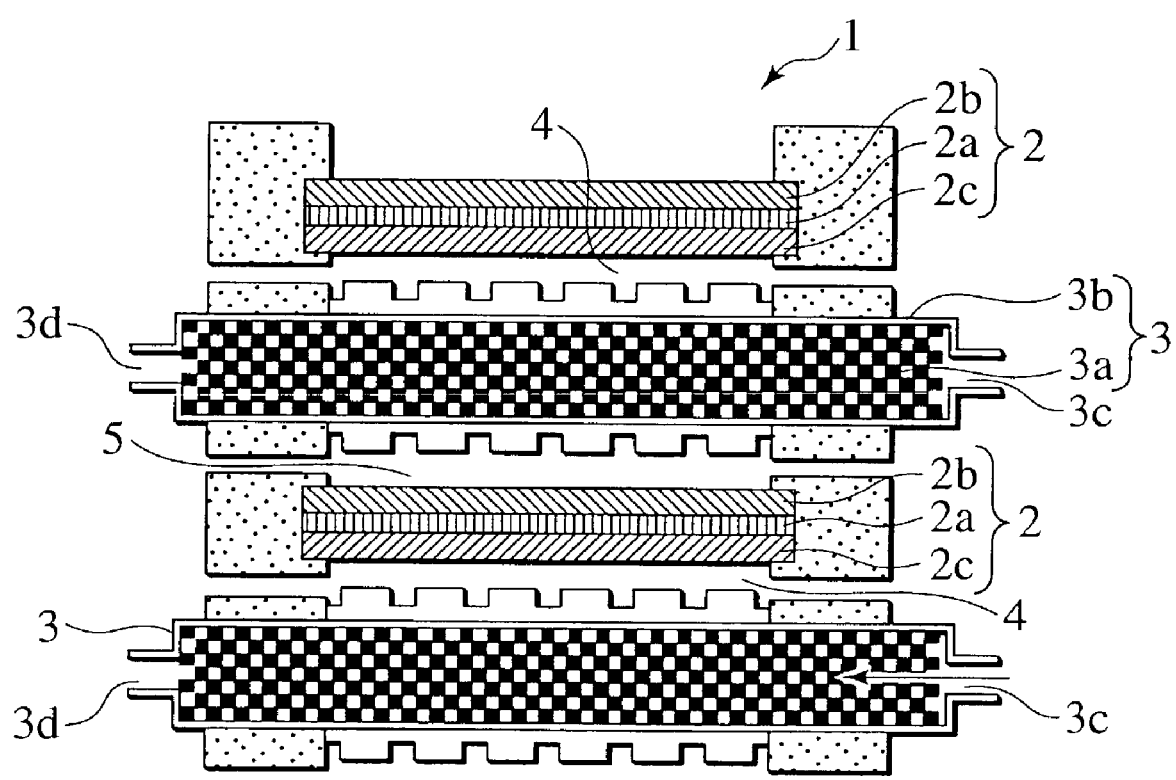
FIG. 1 is a schematic sectional view showing a stack structure of a fuel cell according to a first embodiment of the present invention.

Hereinafter, in order to describe the present invention more in detail, preferred embodiments of this invention will be explained with reference to the accompanying drawings below A fuel cell of the present invention has a combustion heater plate arranged between cell plates of a fuel cell stack, so that the entire stack is not heated from an external unit, but a cell portion is directly heated by the combustion heater inserted between the cell plates. Therefore, the entire stack is quickly heated to a temperature for generating power, greatly improving starting performance of the cell.

For the combustion heater plate, for example, a porous combustion support made of ceramics or heat-resisting metal, and a plate member made of a gas non-pass layer covering a full surface or a part of the porous combustion support, can be used. Also, the combustion heater plate includes an ignition mechanism. Fuel or mixed gas of fuel and air is supplied from a fuel supply port, jetted out from fine pores on a combustion surface of the porous support, and combusted by the ignition mechanism. Therefore, the homogeneous combustion surface is formed, whereby temperatures of opposite cell plate portions of the combustion surface are homogeneously increased. Accordingly, it is possible to increase durability of the cell, and achieve a high output density immediately after starting by preventing deformation or layer peeling-off caused by temperature inclination.

For the porous combustion support of the combustion heater plate, for example, a ceramics porous body mainly containing cordierite, alumina, titania, ceria, zirconia or the like, a porous metal body mainly containing heat-resisting steel, stainless steel, a nickel alloy, a copper alloy, a titanium alloy or the like, a metal felt body or the like can be used.

For the gas non-pass layer covering the surface of the porous combustion support, a thin plate made of, for example, heat-resisting steel or stainless steel, can be used. The non-pass layer also functions as a gas partition wall. Further, it can also function as an inter connector by using an electrically conductive material.

For the ignition mechanism, a normal ignition coil or plug can be used. The ignition mechanism can be installed in an area of mixing fuel for heating and air, or its downstream side.

Incidentally, in the fuel cell of the present invention, no particular limitation is placed on constitution of the cell plate. For example, an electrolyte supported cell, an electrode supported cell, a porous metal plate supported cell including an electrolyte and two electrodes formed on a porous metal plate made of nickel, stainless steel, or the like can be used.

For a fuel electrode material, for example, nickel, nickel cermet, platinum or the like can be used. But the material is not limited to these.

For an air electrode material, for example, oxide of a perovskite structure such as $La_{1-x}Sr_xMnO_3$ or $La_{1-x}Sr_xCoO_3$, silver or the like can be used. But the material is not limited to these.

For an electrolyte material, stabilized zirconia ($ZrO_2$) in which $Nd_2O_3$, $Sm_2O_3$, $Y_2O_3$, $Gd_2O_3$, $Sc_2O_3$ or the like is dissolved, a solid electrolyte mainly containing $CeO_2$, $Bi_2O_3$, $LaGaO_3$ or the like, can be used. But the material is not limited to these. A fluorinated ion exchange membrane containing a sulfonic acid group, for example, a proton exchange membrane fuel cell (PEFC) including Nafion® manufactured by Dupont as an electrolyte, can be used.

A stack layer structure of the fuel cell of the present invention can be made in such a manner that all separators in a fuel stack of a normal type prepared by alternately laminating cell plates including an electrolyte layer, and fuel and air electrode layers, and the separators, are substituted with the foregoing combustion heater plate. Furthermore, one separator out of every predetermined number of separators can be substituted with the combustion heater plate. That is, for example, one separator out of every two or three separators is substituted with the combustion heater plate.

Figure 2:
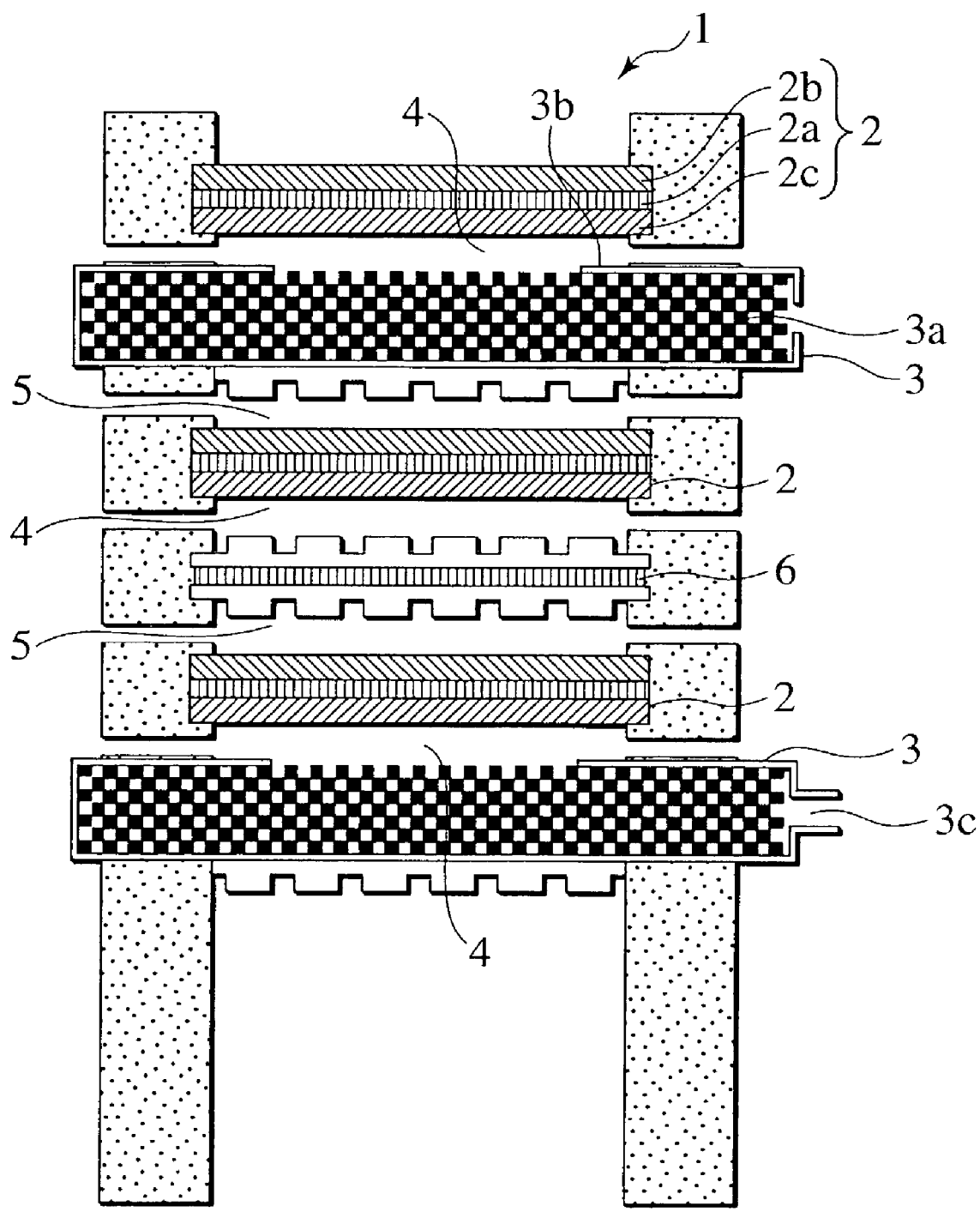
FIG. 2 is a schematic sectional view showing an example including a separator in a stack structure of a fuel cell according to a second embodiment of the present invention.

Each of FIGS. 1 and 2 shows a laminated structure example of such a flat-plate fuel cell stack. FIG. 1 shows a flat-plate fuel cell stack according to a first embodiment, where all the separators are substituted with the combustion heater plate.

Namely, as shown in FIG. 1, the fuel cell stack has a structure formed by alternately laminating cell plates 2 and combustion heater plates 3, the cell plate 2 including a fuel electrode layer 2b and an air electrode layer 2c respectively formed on an upper surface and a backside, in the drawing, of an electrolyte layer 2a. In FIG. 1, numeral 4 denotes an air passage, and numeral 5 denotes a fuel passage for supplying hydrogen or the like.

The combustion heater plate 3 includes a combustion support 3a made of, e.g., a stainless steel porous body, and a gas non-pass layer 3b made of, e.g., a stainless steel thin plate. The combustion heater plate 3 is constructed so as to cover a full surface of the porous combustion support 3a with the gas non-pass layer 3b. A method of heating the cell plate 2 is described hereinafter. At starting time, fuel for heating and air are introduced from a gas supply port 3c of the combustion heater plate 3. Ignition is carried out by an ignition mechanism (not shown). Once combustion is started, the gas non-pass layer 3b is heated, whereby the cell plate 2 is heated. The gas is used by the combustion support 3a, and residual gas is discharged from a gas exhaust port 3d.

The gas non-pass layer 3b becomes a gas partition wall by covering the full surface of the porous combustion support 3a with the gas non-pass layer 3b as described above. Thus, the combustion heater plate 3 functions as a separator, so that gas for combustion and gas for power generation can be separated, and introduced into the fuel cell stack 1 and, even during power generation, the cell plate 2 can be easily subject to follow-up heating independently of control of output electric power.

Further, since the heating of the cell plate 2 is indirectly carried out through the gas non-pass layer 3b, a thermal shock is softened, and a temperature is increased more homogeneously. In addition, in the case of cooling carried out to prevent or stop an excessive temperature increase of the cell plate 2, the gas non-pass layer 3b can function as a cooling plate for introducing air for cooling.

An electrically conductive material such as stainless steel described above can be used for the gas non-pass layer 3b of the combustion heater plate 3, thereby enabling it to function as an inter connector having a current collecting function and an electric connecting function between the cell plates. Therefore, a manufacturing process is simplified by reducing the number of interconnection members.

By the way, needless to say, at starting time, the temperature of the cell plate 2 can be quickly increased by combusting all the combustion heater plates 3 installed in the fuel cell stack 1. Other than this case, depending on requested staring time, a temperature of the fuel cell stack 1 at starting time of heating, or the like, by selectively supplying fuel to the combustion heater plate 3, the cell plate 2 can be heated only by a certain heater plate 3. Also, cooling air can be supplied only to a certain heater plate. Accordingly, not only heating and cooling can be carried out homogeneously, but also the temperature of the fuel cell stack 1 can be adjusted accurately and quickly during power generation.

FIG. 2 shows a laminated structure example of a second embodiment of the present invention, where one separator 6 out of every two separators 6 is substituted with a combustion heater plate 3. From bottom up, a combustion heater plate 3, a cell plate 2, a separator 6, a cell plate 2, a combustion heater plate 3, and a cell plate 2 are laminated in order.

In this case, by opening a part of a gas non-pass layer 3b of the combustion heater plate 3, fuel gas can be combusted on a surface of a combustion support 3a by using air for power generation. Namely, in the combustion heater plate 3 of the embodiment, there is a portion (opening) on a surface opposite the cell plate 2 of the combustion support 3a, in which the gas non-pass layer 3b is not formed. At starting time, fuel is introduced from a gas supply port 3c of the combustion heater plate 3, and air is introduced into an air passage 4 of a fuel cell stack 1. The fuel is combusted on the opening surface of the fuel support 3a, whereby the cell plate 2 is heated. Power is generated by fuel for power generation supplied to a fuel passage 5, and the air supplied to the air passage 4.

In the described case, combustion is carried out in the vicinity of the surface of the combustion support 3a, on which no gas non-pass layers 3b are formed, and a fine pore diameter and porosity of the combustion support 3a are adjusted, thereby achieving homogeneous surface combustion, and since air is introduced from an upper side of the combustion surface, the homogeneous surface combustion can be easily controlled. Moreover, because of direct heating of the cell plate 2, the cell plate 2 can be quickly heated, enabling starting to be carried out within a short time. Also in this embodiment, as in the case of the first embodiment, an electrically conductive material can be used for the gas non-pass layer 3b, thereby enabling it to function as an inter connector.

In the fuel cell of the present invention, the porous combustion support 3a of the combustion heater plate 3 functions as a passage for the fuel for heating or mixed gas of the fuel for heating and air, such that it can be used as a heater for heating the cell. In addition, the porous combustion support 3a can function as a passage for gas (i.e., fuel gas or air) for power generation during power generation.

Figure 3:
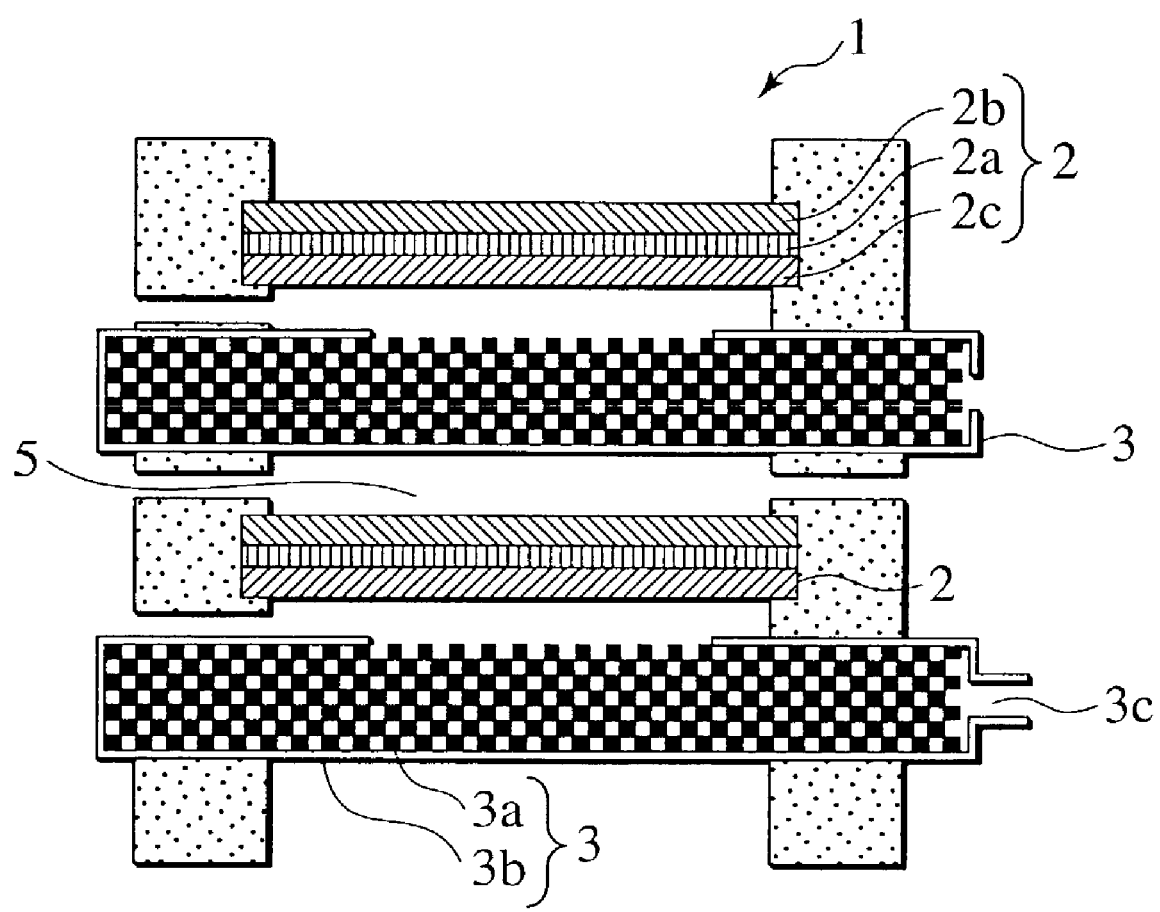
FIG. 3 is a schematic sectional view showing an example of a combustion heater plate also serving as a passage of gas for power generation in a stack structure of a fuel cell according to a third embodiment of the present invention.

FIG. 3 shows a lamination example of a fuel cell stack 1 according to a third embodiment of the present invention, where a porous combustion support 3a functions as a passage for gas for power generation during power generation. The fuel cell stack 1 has a structure formed by alternately laminating combustion heater plates 3 and cell plates 2. The combustion heater plate 3 includes a gas non-pass layer 3b having an opening on an upper side in the drawing, and a porous combustion support 3a having filled the gas non-pass layer 3b. At starting time of the fuel cell, a mixture of fuel for heating and air is introduced from a gas supply port 3c of the heater plate 3. Combustion is carried out in the opening portion of the gas non-pass layer 3b of the porous combustion support 3a, whereby the cell plate 2 is heated. Furthermore, during power generation, only air is supplied from the gas supply port 3c, and power is generated by this air and fuel supplied from a fuel passage 5. Also in this embodiment, as in the cases of the previous embodiments, an electrically conductive material is used for the gas non-pass layer 3b, thereby enabling it to function as an inter connector.

In this case, the combustion heater plate 3 also functions as a passage for gas for power generation. Therefore, the number of components to be laminated is reduced, and the fuel cell stack is miniaturized. Alternatively, by increasing the number of cell plates to be laminated per unit volume, output electric power of the fuel cell is increased. Moreover, a thermal capacity of the fuel cell stack is reduced by the reduced number of components to be laminated, thereby enabling quick heating to be carried out to improve maneuverability. In addition, the porous combustion support 3a of the combustion heater plate 3 functions as a gas diffuser. Accordingly, gas for power generation can be homogeneously supplied to the full cell surface, and output electric power in the cell plate can be homogeneously distributed, whereby an output loss of the entire stack is reduced.

Figure 4:
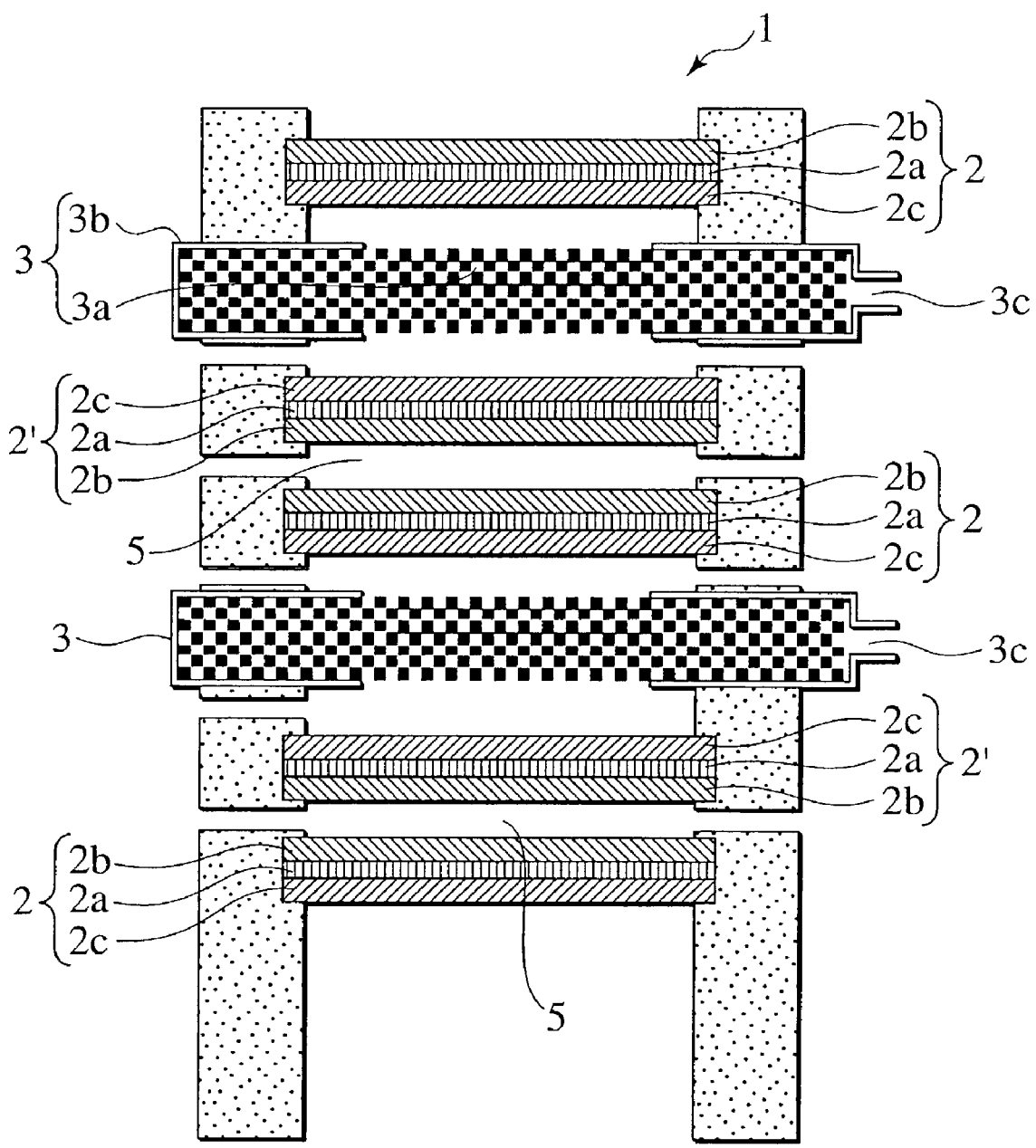
FIG. 4 is a schematic sectional view showing a lamination example of cell plates, in which positions of fuel and air electrodes are opposite, in a stack structure of a fuel cell according to a fourth embodiment of the present invention.

FIG. 4 shows a lamination example of a fuel cell stack according to a fourth embodiment of the present invention, where a combustion heater plate 3 is inserted between each of alternately laminated cell plates 2, and each of cell plates 2' having positions of fuel and air electrode layers 2b and 2c reversed from those of the cell plate 2.

Namely, the cell plate is composed of a cell plate 2 and a cell plate 2'. The cell plate 2 includes a fuel electrode layer 2b formed on an upper surface of an electrolyte layer 2a, and an air electrode layer 2c formed on its bottom surface. Conversely to the cell plate 2, the cell plate 2' includes an air electrode layer 2c formed on an upper surface of an electrolyte layer 2a, and a fuel electrode layer 2b formed on its bottom surface. These cell plates 2 and 2' are alternately laminated, and the combustion heater plate 3 is inserted between every two cell plates 2 and 2'. The combustion heater plate 3 includes openings of a gas non-pass layer 3b on both front and back sides of a porous combustion plate 3a. The openings of the gas non-pass layer 3b are arranged oppositely to the air electrodes 2c and 2c of the cell plates 2 and 2'. In the laminated structure of the fuel cell stack 1, from bottom up, a cell plate 2, a cell plate 2', a combustion heater plate 3, a cell plate 2, a cell plate 2', a combustion heater plate 3, and a cell plate 2 are formed in order.

Also in this embodiment, the combustion heater plate 3 functions as an air passage. As in the case of the foregoing, at starting time of the fuel cell, a mixture of fuel for heating and air is supplied from a gas supply port 3c of the heater plate 3. During power generation, only air is supplied from the gas supply port 3c.

Incidentally, in the fuel cell of the present invention, the porous combustion support 3a of the combustion heater plate 3 may support a catalyst thereby, for example, increasing an amount of heat to be generated by combustion, carrying out homogeneous combustion, reforming fuel, and controlling an exhaust gas component after combustion. For the catalyst, rhodium, ruthenium, platinum, palladium, nickel, cobalt or an alloy mainly containing these can be used. Therefore, combustion can be carried out stably even in a repeated increase of a temperature, and an exhaust component can be controlled during combustion and heating. Specifically, in the case of using exhaust gas after use for combustion as fuel gas for power generation, in order to increase output electric power, an exhaust gas component can be adjusted by controlling partial oxidizing reaction and reforming reaction of fuel.

Figure 5:
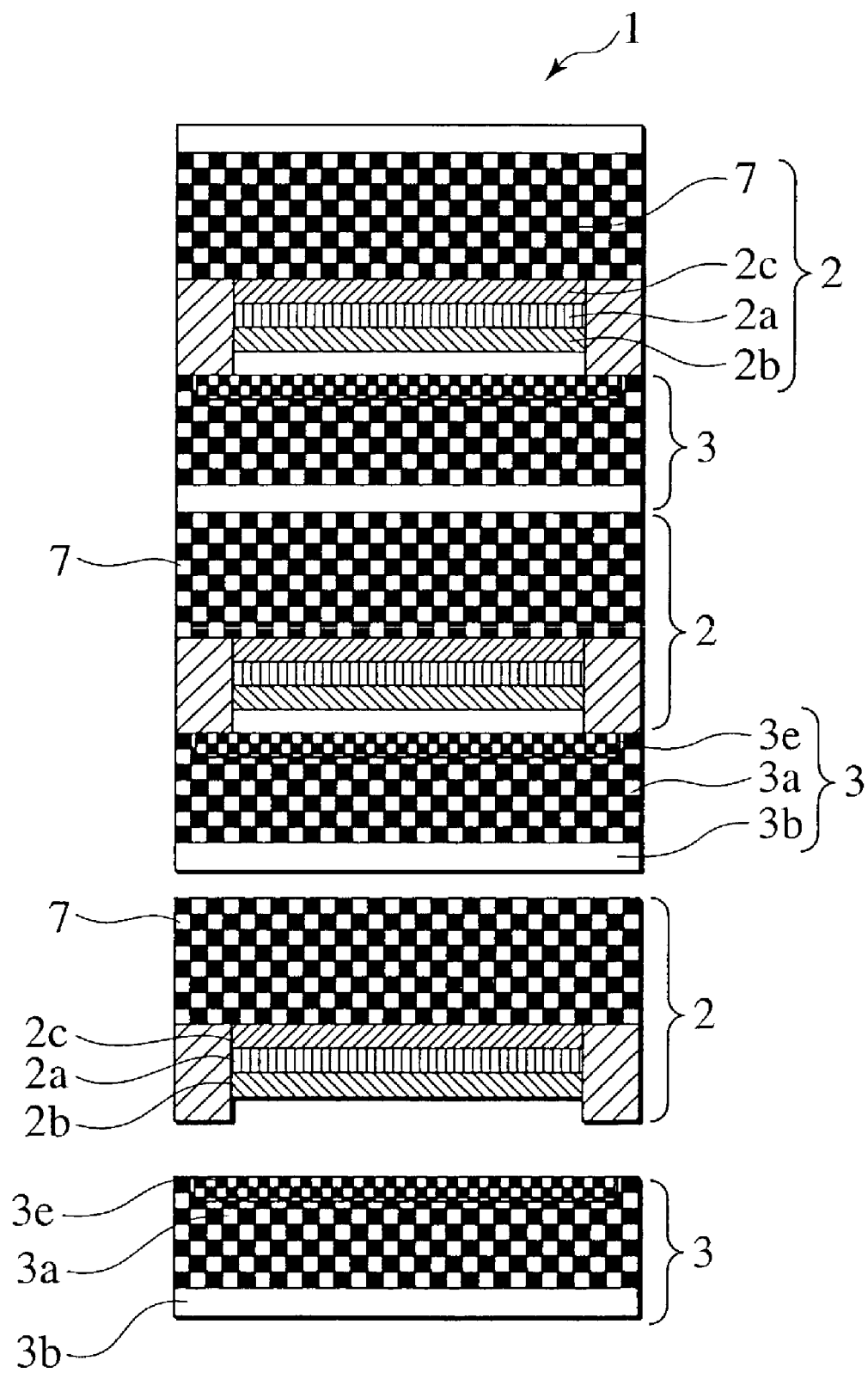
FIG. 5 is a schematic sectional view showing an example of a catalyst being supported on a combustion support of a combustion heater plate in a stack structure of a fuel cell according to a fifth embodiment of the present invention.

FIG. 5 shows a stack structure according to a fifth embodiment of the present invention, where a combustion heater plate 3 including a catalyst supporting layer having a catalyst of the foregoing characteristic is used. The fuel cell stack 1 has a structure formed by alternately laminating cell plates 2 and combustion heater plates 3. The cell plate 2 has a porous metal plate 7 provided to function as an air passage, and a structure where air electrode layer 2c, an electrolyte layer 2a and a fuel electrode layer 2b are formed on its surface in this order. The combustion heater plate 3 includes a porous combustion support 3a, a catalyst supporting layer 3e, and a gas non-pass layer 3b. At starting time of the fuel cell, a mixed gas of fuel for heating and air is supplied to the porous combustion support 3a of the combustion heater plate 3. During power generation, only fuel for power generation is supplied to the porous combustion support 3a, and air is also supplied to the porous metal plate 7 of the cell plate 2, thereby generating power.

Figure 6:
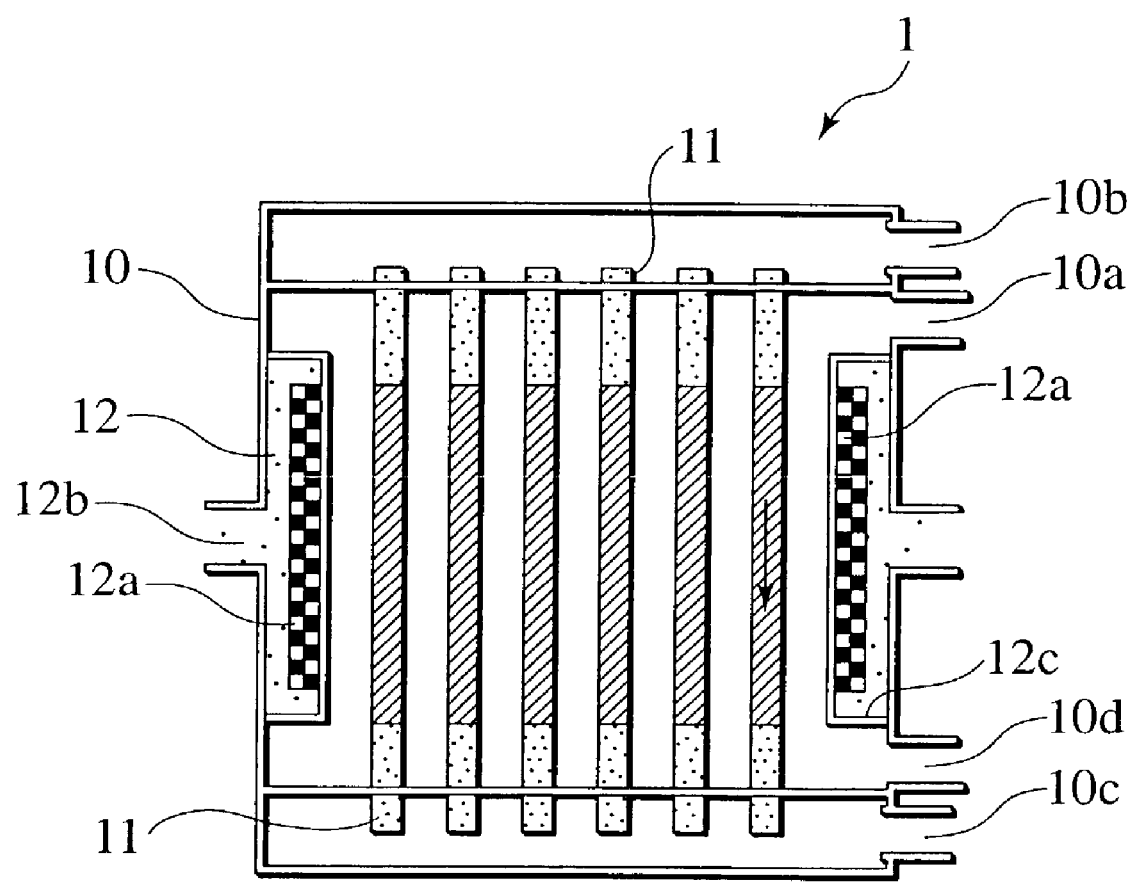
FIG. 6 is a schematic sectional view showing an example of a combustion heater being applied to a cylindrical fuel cell stack in a stack structure of a fuel cell according to a sixth embodiment of the present invention.

FIG. 6 shows an example of a stack structure according to a sixth embodiment of the present invention, where a combustion heater is applied to a cylindrical fuel cell stack. A fuel cell stack 1 includes a plurality of cylindrical cells 11 in a stack chamber 10. Moreover, on an inner wall of the stack chamber 10, a porous combustion support 12a made of heat-resisting metal felt or the like, a gas non-pass layer 12c covering the porous combustion support 12a, and a combustion heater 12 having an ignition mechanism (not shown) are provided. A combustion surface of the porous combustion support 12a is arranged oppositely to a power generation layer of the cylindrical cell 11.

In the fuel cell stack 1, at starting time, fuel for heating is supplied from a gas support port 12b of the combustion heater 12 to the porous combustion support 12a, and air is supplied from an air supply port 10a of the stack chamber 10. Accordingly, the fuel for heating is combusted on a surface of the combustion support 12a. By this combustion, the gas non-pass layer 12c is heated. Heat is transmitted around from the surface of the heated gas non-pass layer 12c and, by this heat transmission, the plurality of cylindrical cells 11 are heated. Mainly the power generation layer of the cylindrical cell 11 is quickly heated, enabling a temperature distribution to be made homogeneous in the cell. Therefore, the fuel cell stack 1 is quickly started. During power generation, fuel for power generation is supplied from a fuel supply port 10b, and air is supplied from the air supply port 10a, thereby progressing power generation. Residual fuel of the power generation fuel is discharged from a fuel exhaust port 10c of the stack chamber 10, and combustion exhaust gas or residual air after power generation is exhausted from an air exhaust port 10d. Incidentally, in heating at starting time, mixed gas of fuel for heating and air may be supplied from the gas support port 12b of the combustion heater 12. During cooling, by introducing cooling air from the gas supply port 12b, the porous combustion support 12a can be homogeneously and quickly cooled.

Each of FIGS. 7A and 7B shows an example of a stack structure according to a seventh embodiment of the present invention, where a combustion heater is applied to a cylindrical fuel cell stack different from that of the sixth embodiment. In a fuel cell slack 1, a plurality of cylindrical cells 11 are provided in a stack chamber 10. In addition, a porous combustion support 12a of a combustion heater 12 is arranged in the stack chamber 10 so as to fill gaps among the cylindrical cells 11. In this case, preferably, the porous combustion support 12a is electrically insulated. Alternatively, at least a surface facing an electrode on a surface of the cylindrical cell 11 is preferably subjected to insulation processing. Further, on a center of the stack chamber 10, an introduction duct 13 is provided in a manner of penetrating the porous combustion support 12 up and down, to supply gas for heating to the porous combustion support 12a.

In the fuel cell stack 1, at starting time, mixed gas of fuel for heating and air is supplied from a fuel supply port 10b of the stack chamber 10. Then, the fuel for heating is combusted on a surface of the porous combustion support 12a. Heat generated by the combustion of the porous combustion support 12a is transmitted to the cylindrical cell 11. Accordingly, each cylindrical cell 11 is heated more quickly and homogeneously, whereby starting performance of the fuel cell stack is improved, and an output loss of the entire fuel cell stack is reduced. After a temperature increase, fuel for power generation supplied from the fuel supply port 10b is jetted out from fine pores of the porous combustion support 12a, and air is supplied from an air supply port 10, thereby generating power. In this case, the porous combustion support 12a of the combustion heater 12 functions as a gas diffuser, so that the fuel for power generation can be homogeneously supplied to all the cell surfaces, and a distribution of output electric power can be made homogeneous. Residual air after use for the power generation is discharged from an air exhaust port 10d of the stack chamber 10. From a fuel exhaust port 10c, residual fuel for power generation is discharged during power generation, and combustion exhaust gas is discharged during heating. A heating portion and a sealing portion 14 of the cylindrical cell can be installed away from each other at staring time, such that damaging of the sealing portion 14 by a thermal shock can be prevented. Moreover, cell power generation portions can be homogeneously heated, so that a fuel cell having high durability and capable of obtaining a high output quickly can be obtained.

Hereinafter, the present invention is described in detail based on examples. It should be understood, however, that the invention is not limited only to the examples.

EXAMPLES

First Example (a) Combustion Heater Plate

As a porous combustion support 3a, metal felt made of Fe—Cr—Al containing heat-resisting steel and having a thickness of 2 mm is used. A full surface of the combustion support 3a was covered with a thin plate (i.e., gas non-pass layer 3b) made of heat-resisting steel, and supply and exhaust ports 3c and 3e for heating gas were formed on parts of a side face. Thus, a combustion heater plate 3 as shown in FIG. 1 was obtained. In this time, as in the case of a normal separator, a material layer identical to an electrode material of an opposite cell plate can be formed on the gas non-pass layer 3b for control of a passage, and an increase of a heating area.

(b) Cell Plate (Air Electrode Supporting Type)

First, a solvent and a binder were added to lanthanum strontium manganate LaSrMnO$_3$ (abbreviated to LSM, hereinafter) powder having a mean diameter of particles 3 to 10 µm, and mixed. This mixture was formed in a plate shape by extrusion molding. By sintering this plate at 1300 to 1500° C., an air electrode plate of 50 mm×50 mm was formed. Then, slurry containing yttria-stabilized zirconia (Yttria-Stabilized Zirconia is abbreviated to YSZ, hereinafter) of a mean diameter of particles 0.5 µm was coated on a plate as the air electrode 2c by a slurry coating process. This was sintered at 1200 to 1400 ° C. to form an electrolyte layer 2a. Then, slurry containing Ni powder of a mean diameter of particles 1 to 5 µm, and YSZ powder of a mean diameter of particles 1 µm was coated on the electrolyte layer 2a by the slurry coating process, and sintered at 1100 to 1400° C. to form a fuel electrode layer 2b. Thus, the cell plate 2 of the air electrode supporting type was obtained.

(c) Lamination of Stack

As in the case of a normal flat-pate stack, as shown in FIG. 1, the cell plates 2 and the combustion heater plates 3 were alternately laminated by ten layers to form a fuel cell stack 1. Further, as in the case of the normal flat-plate stack where the cell plates on and below the separator layer were electrically connected in series by the inter connector, the upper and lower cell plates 2 were connected in series through a gas non-pass layer 3b of the combustion heater plate 3.

(d) Heating Test

Figure 8:
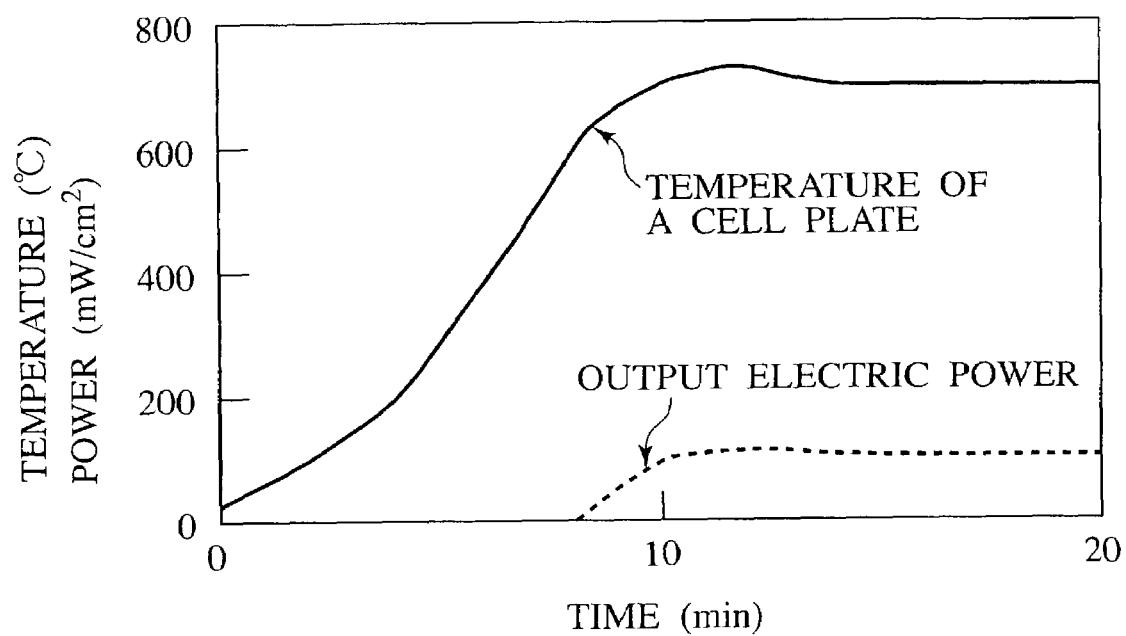
FIG. 8 is a graph showing changes in a cell plate temperature and output electric power with a passage of time after a start of heating in the fuel cell of the first example of the present invention.

Propane was used as fuel gas for heating. A mixture of propane and air was introduced from a gas supply port 3c of the combustion heater plate 3. Combustion was started by ignition carried out by an ignition mechanism installed in front of the gas supply port 3c. At such a time, an air-fuel ratio of heating gas, or a flow rate of gas can be adjusted according to required starting time or power generation temperature. A temperature of the cell plate 2 was measured by a thermocouple installed on a surface of the cell plate 2, and a change with time in the cell plate temperature was investigated. Then, it was verified that the temperature was increased from a room temperature to 700° C. in ten min., (see FIG. 8). In addition, in the temperature increase, it was observed that almost no variance occurred in a temperature distribution on the surface of the cell plate 2, and the temperature was increased homogeneously. Also, it was verified that no damages such as cracks or peeling-off occurred in the cell plate 2.

(e) Power generation Test

While the temperature of the cell plate 2 was maintained at 700° C., hydrogen was introduced as fuel gas for power generation to a fuel passage, and air was supplied to an air passage 4, thus starting power generation. As a result, it was discovered that stable output electric power could be obtained immediately after the temperature increase to 700° C., and output electric power of 0.1 W/cm$^2$ could be obtained (see FIG. 8).

Second Example

A cell plate 2 similar to that in the first example was used. Further, a combustion heater plate 3 of a type having a structure basically similar to that of the combustion heater plate 3 shown in the first example, in which no gas non-pass layers 3b are formed on a surface opposite the cell plate 2, was used. Also, a separator 6 having passages of fuel and air electrode materials formed on both surfaces of a lanthanum-chrome containing oxide plate was used. As shown in FIG. 2, one separator out of every two separators in a normal stack formed by alternately laminating cell plates and the separators was substituted with a combustion heater plate 3. Accordingly, a fuel cell stack 1 was formed by including four cell plates 2, two combustion heater plates 3, and three separators 6 (separator 6, cell plate 2, combustion heater plate 3, cell plate 2, separator 6, cell plate 2, combustion heater plate 3, cell plate 2, and separator 6). Moreover, as in the case of the first example, the cell plates 2 were connected in series through the gas non-pass layer 3b of the combustion heater plate 3.

At starting time, propane gas was introduced from a gas supply port 3c of the combustion heater plate 3, and air was introduced to an air passage 4. Heating was started by ignition carried out by an ignition mechanism installed in the heater plate 3. After a temperature was increased to a predetermined temperature, a flow rate of fuel (propane gas) for heating was stopped or reduced, and hydrogen was supplied as fuel gas for power generation to a fuel passage 5, thus starting power generation. In the fuel cell of this example, it was verified that the temperature was increased from a room temperature to 700° C. in about fifteen min. Furthermore, it was verified that after the temperature increase, output electric power of 0.2 W/cm$^2$ could be obtained.

Third Example

A cell plate 2 similar to that in the first example was used. For a porous combustion support 3a, as in the case of a general exhaust gas processing catalyst converter, a cordierite honeycomb supporting Pt was used as a catalyst. A combustion heater plate 3 having no gas non-pass layers 3b formed on a surface opposite the cell plate 2 in the combustion support 3a was used. Except for use of the combustion heater plate 3 having such a characteristic, a fuel cell stack 1 having a laminated structure similar to that of the first example was obtained (refer to FIG. 3).

At starting time of the fuel cell, a mixed gas of fuel (propane gas) for heating and air was introduced from a gas supply port 3c of the combustion heater plate 3, thus heating the cell plate 2. After a temperature was increased to a predetermined temperature, an air-fuel ratio was reduced, and fuel gas for power generation (hydrogen) was supplied to a fuel passage 5, thus starting power generation. In the fuel cell of this example, Pt is used as the catalyst, so that combustion of the fuel for heating becomes homogeneous and efficient, enabling heating to be carried out by combustion without carbonization to cause clogging. Moreover, a porous combustion support 3a of the combustion heater plate 3 functions as an air diffuser, such that gas for power generation can be homogeneously supplied to a full surface of the cell plate 2 and a distribution of output electric power can be made homogeneous. In the fuel cell, it was verified that the temperature could be increased from a room temperature to 700° C. in about seventeen min. Also, it was verified that after the temperature increase, output electric power of 0.2 W/cm$^2$ could be obtained.

Fourth Example

A cell plate 2 similar to that in the first example was used. A cell plate 2' having formation surfaces of fuel and air electrode layers 2b and 2c reversed from those of the cell plate 2 was used. A combustion heater plate 3 of a type having a structure basically similar to that of the combustion heater plate 3 shown in the first example, but having openings, in which no gas non-pass layers 3b are formed, on both surfaces of a combustion support 2a was used. As shown in FIG. 4, obtained was a fuel cell stack 1 formed by including totally six cell plates 2 and 2', and three combustion heater plates 3, where a cell plate 2, a cell plate 2', a combustion heater plate 3, a cell plate 2, a cell plate 2', and a combustion heater plate 3 were laminated in this order.

In the fuel cell using the stack 1, a laminated density of cell plates per unit volume is increased, thereby increasing an output density. Moreover, the cell plates 2 and 2' can be quickly heated evenly, thereby improving maneuverability. In the fuel cell, it was verified that the temperature was increased from a room temperature to 700° C. in about eighteen min. Further, it was verified that after the temperature increase, output electric power of 0.25 W/cm$^2$ could be obtained.

Fifth Example

Figure 9B:
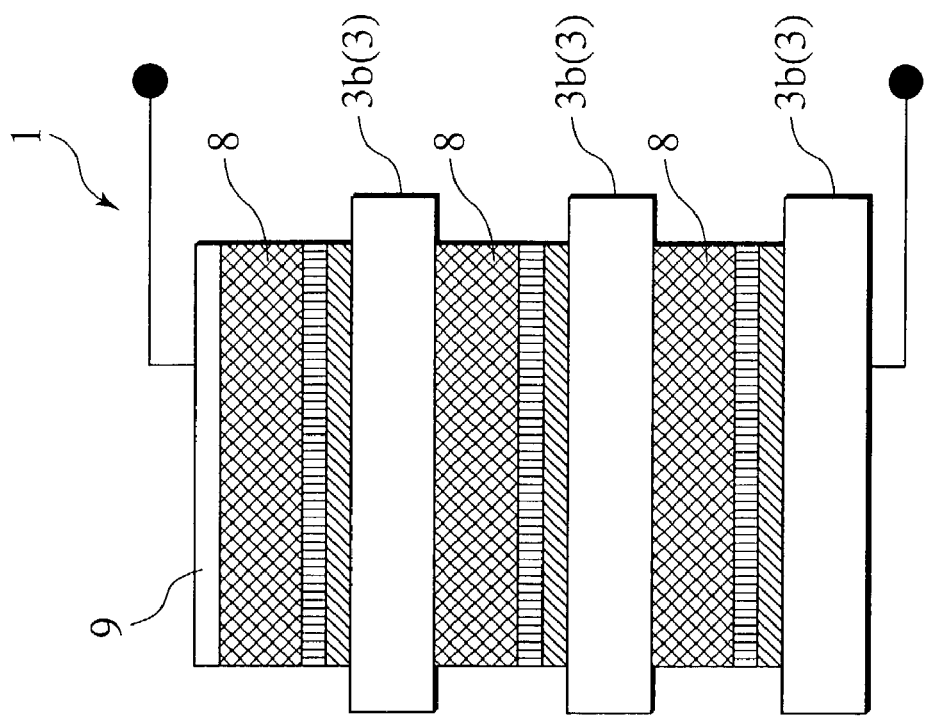
FIGS. 9A and 9B are schematic sectional views, each thereof showing a structure of a fuel cell stack of the fifth example of the present invention.
Figure 9A:
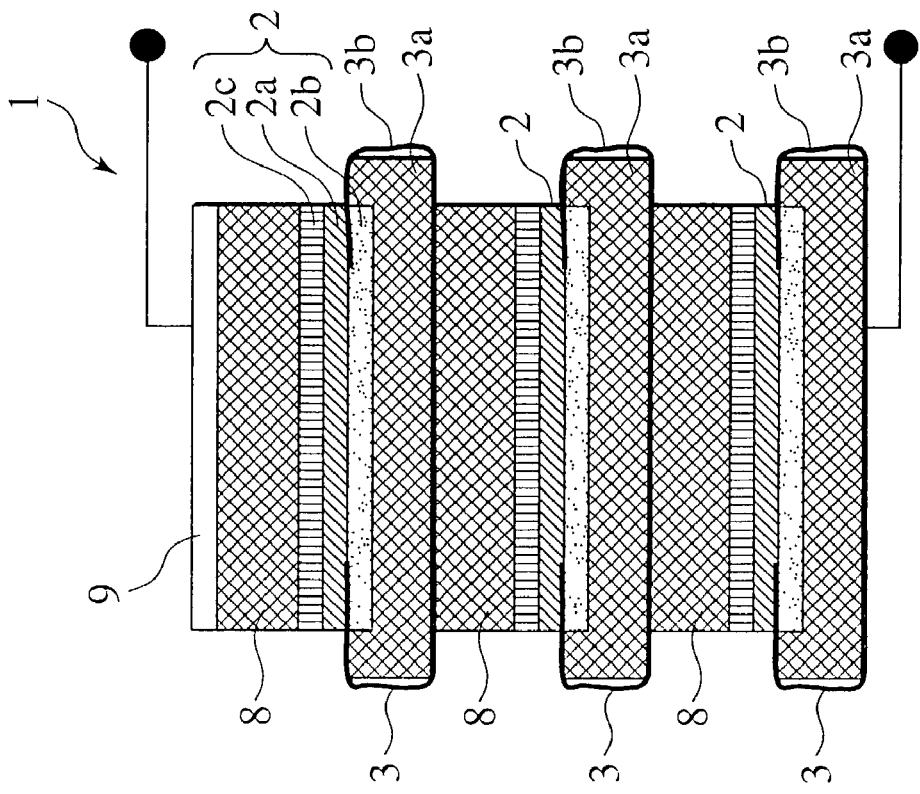
Figure 10C:
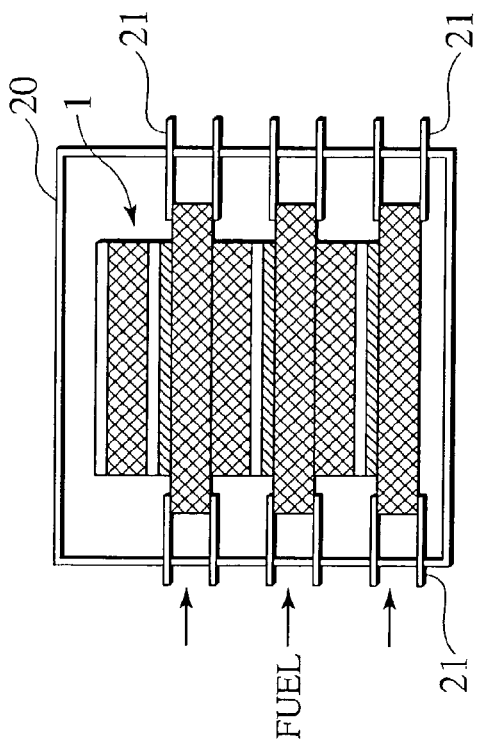
FIGS. 10A to 10D are sectional and external views, each thereof showing a state where the fuel cell stack shown in each of FIGS. 9A and 9B is fixed in a chassis.
Figure 10D:
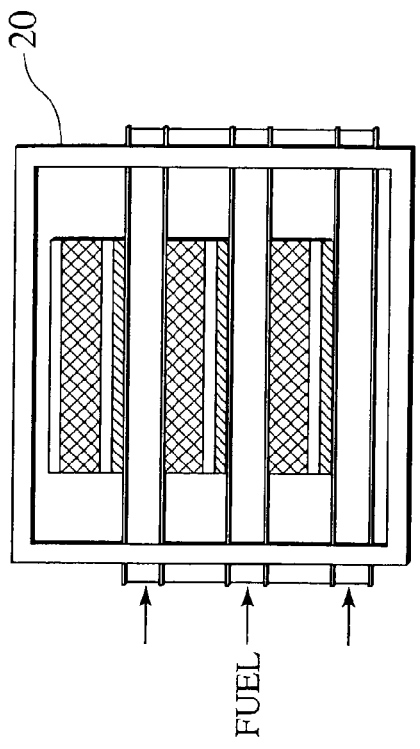
Figure 10A:
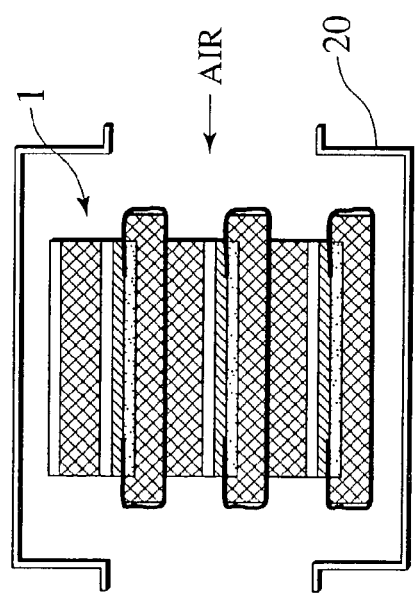
Figure 10B:
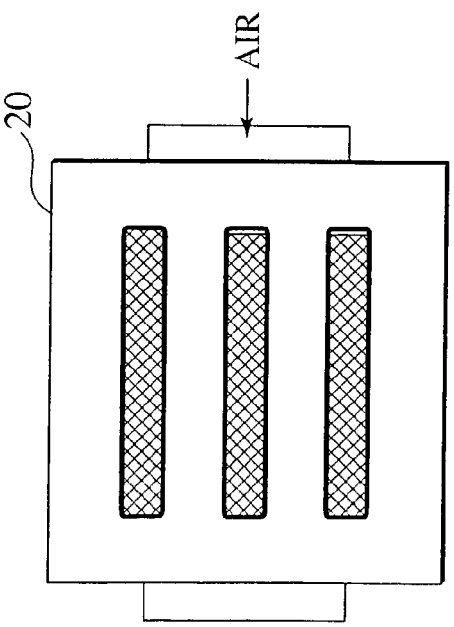

A fuel cell stack 1 shown in FIGS. 9A and 9B was manufactured. Concretely, the fuel cell stack 1 is formed by alternately laminating a cell plate 2 similar to that of the first example, a combustion heater plate 3 provided with a porous combustion support 3a supporting a catalyst of Pt, and expandable metal 8 by Inconel. Further, a current collecting plate 9 by Inconel is laminated on the laminate body. As shown in FIGS. 10A to 10D, the fuel cell stack 1 was fixed in a chassis 20. Moreover, in order to insulate a gas non-pass layer 3b of the combustion heater plate 3, an alumina insulating member 21 was soldered to its tip. Also, a gap between the chassis 20 and the fuel cell stack 1 was filled with ceramics wool, whereby the fuel cell stack 1 was prevented from being moved in the chassis 20.

At starting time of the fuel cell, mixed gas of fuel (propane gas) for heating and air was introduced to the combustion heater plate 3, thereby heating the cell plate 2. After a temperature was increased to a predetermined temperature, fuel for power generation (hydrogen) was supplied to the combustion heater plate 3, and air was supplied into the chassis 20, thus carrying out power generation. In the fuel cell of this example, it was verified that the temperature could be increased from a room temperature to 700° C. in about twenty min. Also, it was verified that after the temperature increase, output electric power of 0.18 W/cm$^2$ could be obtained.

Sixth Example

A cylindrical cell 11 is constructed by sequentially forming a fuel electrode layer made of YSZ—NiO cermet, and an air electrode layer made of LSM on an outer peripheral part of an electrolytic base tube made of YSZ. The cylindrical cell 11 belongs to a well-known technology. By arranging ten cylindrical cells 11 in a stack chamber 10, a cylindrical fuel cell stack 1 as shown in FIG. 6 was manufactured. A combustion heater 12 is installed on an inner wall surface of the stack chamber 10. Metal felts (porous combustion support) 12a made of heat-resisting steel are arranged in the vicinity of a power generation layer of the cylindrical cell 11 oppositely to each other. A gas non-pass layer 12c is formed on a side face of the heat-resisting steel metal felt 12a, and a gas supply port 12b is formed on a backside thereof.

At starting time of the fuel cell, a mixture of fuel for heating and air is introduced from the gas supply port 12b on the backside of the combustion heater 12. Then, the fuel is combusted by ignition carried out by an ignition mechanism, whereby the cylindrical cells 11 are heated. After a temperature increase, only air or mixed gas having an air-fuel ration increased is supplied from the gas supply port 12b, and air is supplied from an air supply port 10a, thereby carrying out power generation. Incidentally, also during power generation, in order to maintain a combustion temperature of the combustion heater 12, mixed gas of fuel for heating and air can be supplied from the gas supply port 12b of the combustion heater 12 while the air is supplied from the air supply port 10a.

Seventh Example

A cylindrical fuel cell stack 1 as shown in FIGS. 7A and 7B was manufactured by arranging ten cylindrical cells 11 used in the sixth example in a stack chamber 10. In the cylindrical fuel cell stack 1, for a porous combustion support 12a of a combustion heater 12, a ceramics support made of cordierite was used. In the porous combustion support 12a, through-holes for inserting the cylindrical cells 11 are formed. Further, on the porous combustion support 12a, a catalyst having functions of stabilizing combustion and reforming fuel is supported.

At starting time of the fuel cell, mixed gas of fuel for heating and air is supplied from a fuel supply port 10b of the stack chamber 10. After a temperature increase, only fuel for power generation or mixed gas of a high power generation fuel-air ratio is supplied from the fuel supply port 10b, and air is supplied from an air supply port 10a, whereby power generation is carried out.

As described above, according to the fuel cell of the present invention, the combustion heater is arranged in the fuel cell stack. Therefore, the power generation layer of the cell plate or the cylindrical cell can be directly heated evenly, homogeneously and quickly, and starting time such as starting of the fuel cell or restarting can be shortened. Furthermore, the present invention brings about an effect that an electric power loss can be reduced by preventing local variance in output electric power, and power can be generated at a high output density immediately after starting of power generation.

The present disclosure relates to subject matters contained in Japanese Patent Application No. 2001-332088, filed on Oct. 30, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A fuel cell stack comprising:
  a stack formed by stacking cell plates, each of the cell plates provided with an electrolyte layer, a fuel electrode layer formed on one surface of the electrolyte layer and an air electrode layer formed on another surface of the electrolyte layer; and
  combustion heater plates disposed among the cell plates, the combustion heater plates heating the cell plates using gas for combustion including fuel and air and separated from gas for generation, and each of the combustion heater plates being provided with a porous combustion support that has a plate shape and a gas non-pass layer that covers the porous combustion support, exhibits electrical conductivity and serves as an inter connector, wherein the cell plates include first cell plates and second cell plates, each of the first cell plates provided with a first electrolyte layer, a first fuel electrode layer formed on one surface of the first electrolyte layer and a first air electrode layer formed on another surface of the first electrolyte layer and each of the second cell plates provided with a second electrolyte layer, a second fuel electrode layer formed on one surface of the second electrolyte layer and a second air electrode layer formed on another surface of the second electrolyte layer, wherein the first fuel electrode layer of the first cell plates and the second fuel electrode layer of the second cell plates are opposed to one another, and wherein each of the combustion heater plates is intermittently arranged with respect to both the first cell plates and the second cell plates.

2. The fuel cell stack according to claim 1,
wherein the stack further comprises separators,
wherein the stack is formed by alternately laminating each of the cell plates and each of the separators, and
wherein all the separators are substituted by the combustion heater plates.

3. The fuel cell stack according to claim 1,
wherein the stack further comprises separators,
wherein the stack is formed by alternately laminating each of the cell plates and each of the separators, and
wherein one separator out of every predetermined number of the separators is substituted by each of the combustion heater plates.

4. The fuel cell stack according to claim 1,
wherein each of the combustion heater plates is intermittently arranged with respect to the cell plates.

5. The fuel cell stack according to claim 1,
wherein the gas non-pass layer functions as a gas partition wall.

6. The fuel cell according to claim 1,
wherein the gas non-pass layer covers the full surface of the porous combustion support.

7. The fuel cell stack according to claim 1,
wherein a catalyst is supported on the porous combustion support.

8. The fuel cell stack according to claim 1,
wherein the combustion heater plates heats the cell plates by combusting the gas for combustion through the porous combustion supports.

9. A fuel cell stack comprising:
a stack formed by stacking cell plates, each of the cell plates provided with an electrolyte layer, a fuel electrode layer formed on one surface of the electrolyte layer and an air electrode layer formed on another surface of the electrolyte layer; and
combustion heater plates disposed among the cell plates, the combustion heater plates heating the cell plates using gas for combustion including fuel and air and separated from gas for generation, and each of the combustion heater plates being provided with a porous combustion support that has a plate shape and a gas non-pass layer that covers the porous combustion support, exhibits electrical conductivity and serves as an inter connector,
wherein the gas non-pass layer covers a partial surface of the porous combustion support to expose the porous combustion support to corresponding one of the cell plates.

10. A fuel cell stack comprising:
a stack formed by stacking cell plates, each of the cell plates provided with an electrolyte layer, a fuel electrode layer formed on one surface of the electrolyte layer and an air electrode layer formed on another surface of the electrolyte layer; and
combustion heater plates disposed among the cell plates, the combustion heater plates heating the cell plates using gas for combustion including fuel and air and separated from gas for generation, and each of the combustion heater plates being provided with a porous combustion support that has a plate shape and a gas non-pass layer that covers the porous combustion support, exhibits electrical conductivity and serves as an inter connector,
wherein a part of the gas non-pass layer facing to corresponding one of the cell plates is opened toward the corresponding one of cell plates.

11. A fuel cell stack comprising:
a stack formed by stacking cell plates, each of the cell plates provided with an electrolyte layer, a fuel electrode layer formed on one surface of the electrolyte layer and an air electrode layer formed on another surface of the electrolyte layer; and
combustion heater plates disposed among the cell plates, the combustion heater plates heating the cell plates using gas for combustion including fuel and air and separated from gas for generation, and each of the combustion heater plates being provided with a porous combustion support that has a plate shape and a gas non-pass layer that covers the porous combustion support, exhibits electrical conductivity and serves as an inter connector,
wherein the porous combustion support functions as a passage of gas for power generation.

12. A fuel cell stack comprising:
a cylindrical stack having cylindrical cells and a stack chamber; and
combustion heaters having porous combustion supports and heating the cylindrical cells using gas for combustion including fuel and air, the fuel of the gas for combustion being supplied through a gas supply port different from that through which gas for power generation is supplied,
wherein the porous combustion supports are arranged to fill gaps among the cylindrical cells, and
wherein a combustion surface of each of the porous combustion supports is arranged opposing to a power generation layer of corresponding one of the cylindrical cells.

13. The fuel cell stack according to claim 12,
wherein fuel is supplied for heating to the porous combustion supports, and air is supplied to the porous combustion supports through the stack chamber.

14. The fuel cell according to claim 12,
wherein the combustion heaters heats the cylindrical cells by combusting the gas for combustion through the porous combustion supports.

* * * * *